United States Patent [19]

Dickson, Jr.

[11] 4,203,555

[45] May 20, 1980

[54] ROTARY FOODSTUFF MILL AND MILLING PROCESS

[76] Inventor: Thomas D. Dickson, Jr., 1099 Del Cambre, San Jose, Calif. 95129

[21] Appl. No.: 28,666

[22] Filed: Apr. 10, 1979

Related U.S. Application Data

[63] Continuation-in-part of Ser. No. 905,841, May 15, 1978, abandoned.

[51] Int. Cl.² .............................................. B02C 7/09
[52] U.S. Cl. ...................................... 241/15; 241/24; 241/79.1; 241/100; 241/248; 241/261; 241/261.2
[58] Field of Search ...................... 241/24, 30, 15, 62, 241/79.1, 245, 248, 249, 259.1, 261, 261.2, 100

[56] References Cited

U.S. PATENT DOCUMENTS

| | | | |
|---|---|---|---|
| 6,902 | 11/1849 | Learned et al. | 241/56 |
| 213,471 | 3/1879 | Toufflin | 241/30 X |
| 335,827 | 2/1886 | Mead | 241/48 |
| 543,633 | 7/1895 | Schoff | 241/169.1 |
| 901,217 | 10/1908 | Touya, Jr. | 241/188 A |
| 1,447,013 | 2/1923 | Graaf | 241/12 X |
| 1,970,330 | 8/1934 | Mason | 241/251 X |
| 2,347,383 | 4/1944 | Wiegratz | 241/89.1 |
| 3,497,144 | 2/1970 | Hint | 241/188 R |
| 3,815,835 | 6/1974 | Apostol et al. | 241/261 X |
| 3,995,784 | 12/1976 | de los Santos Izquierdo | 241/275 |
| 4,004,741 | 1/1977 | Perry | 241/55 |
| 4,011,027 | 3/1977 | Selder | 241/188 A X |

Primary Examiner—Mark Rosenbaum
Attorney, Agent, or Firm—Thomas E. Ciotti

[57] ABSTRACT

A rotary mill for milling particulate material is described. The preferred embodiment of the mill comprises a housing; a rotor and a stator axially aligned and spaced within the housing, each of which has concentric rows of circumferentially spaced tapered plane-sided blades extending from one of its faces, the rows on the rotor and stator being interposed between each other and radially spaced, with the radially innermost row being on the rotor and having a blade spacing at least equal to the maximum nominal particle size of the material, and the outermost row being on the stator and having a blade spacing less than the innermost row and at least equal to the desired maximum nominal particle size of the milled material; a material inlet in the housing that opens into the axial space between the rotor and stator inward of the innermost row; a pneumatic feed regulating means that mixes air with the feed entering said axial space and thereby controls the feed rate and milled material particle size; a milled product outlet in the housing located radially outward of the outermost row; a receiving pan for collecting milled product; a cyclone separator in the receiving pan for separating entrained milled product; and an electric motor whose driving shaft is connector to the rotor.

18 Claims, 11 Drawing Figures

ROTARY FOODSTUFF MILL AND MILLING PROCESS

CROSS-REFERENCE TO RELATED APPLICATION

This application is a continuation-in-part of copending application Ser. No. 905,841, filed May 15, 1978, now abandoned.

BACKGROUND OF THE INVENTION

1. Field of the Invention

The invention relates to a rotary mill for milling particulate material such as grains and legumes and to a process for milling such material.

2. Description of the Prior Art

Rotary disintegrators in which particulate material is passed radially outward between interposed, widely spaced rows of pins or bars extending from opposed surfaces of a pair of rotors or a rotor-stator combination are described in U.S. Pat. Nos. 901,217 and 3,497,144. These disintegrators operate at relatively low speeds and apparently grind the material between the pins or bars or break the material through impact with the bars or pins.

U.S. Pat. No. 3,815,835 discloses a rotary disintegrator in which particulate material is disintegrated by passage between interposed rings of frustoconical teeth on a rotor and stator. The space between teeth in each ring is identical. The spaces between teeth also are inclined relative to the direction of rotation.

SUMMARY OF THE INVENTION

A principal object of the invention is to provide a mill and milling process that is adaptable for use in home kitchens to mill foodstuffs such as dried fruit, dried vegetables, grain, sugar, and legumes efficiently and cleanly to a uniform particle consistency.

Accordingly one aspect of the invention is a rotary mill that includes: a housing; a first wheel mounted within the housing and having concentric rows of circumferentially spaced tapered plane-sided blades extending from one of its faces; and a second wheel mounted within the housing in spaced, axial alignment with the first wheel and also having concentric rows of circumferentially spaced tapered plane-sided blades extending from one of its faces. The blades of both wheels have a greater circumferential dimension than radial dimension. The first and second wheels are positioned with their respective rows of blades interposed in spaced, alternating relationship. The spacing between blades in the innermost row of the interposed rows must be at least equal to the maximum nominal particle size of the particles of material to be milled and the spacing between the blades of the outermost row of the interposed rows must be less than the spacing between blades in the innermost row and be at least equal to the desired maximum nominal particle size of the milled material. The mill also includes an inlet in the housing for receiving the material to be milled that opens into the space between the wheels radially inward of the innermost row of blades; an outlet in the housing for discharging the milled material located radially outward of the outermost row of the interposed rows of blades; and driving means connected to at least the wheel on which said innermost row is located for rotating that wheel such that the relative linear velocity between the innermost row of blades and the row next adjacent to the innermost row is sufficient to shear the material to be milled between the blades of the innermost row and the blades of said next adjacent row.

The term "maximum nominal particle size" used herein means the largest dimension of the average particle of material to be milled or milled material, as the case may be.

Another aspect of the invention is a process for milling a particulate material. The first step of the process is positioning a first wheel having concentric rows of circumferentially spaced, tapered plane-sided blades extending from one of its faces in spaced axial alignment with a second wheel that also has concentric rows of circumferentially spaced, tapered plane-sided blades extending from one of its faces such that the rows of blades on the wheels are interposed between each other. The circumferential spacing between blades in the innermost row of the interposed rows must be at least equal to the maximum nominal particle size of the material to be milled and the circumferential spacing between blades in the outermost row of the interposed rows must be less than the circumferential spacing between blades in the innermost row and be at least equal to the desired maximum nominal particle size of the milled material. The next step is feeding the material into the axial space between the wheels radially inward of said innermost row. The third step is rotating at least the wheel on which the innermost row is located at a speed sufficient to cause the material to move through the spaces in the innermost row, to be sheared between the blades of the innermost row and the row next adjacent the innermost row, and to pass successively outwardly through the spaces between the blades of the interposed rows and be successively comminuted to a smaller particle size as it passes through each row. There is no significant recirculation of material inwardly. The last step of the process is to collect the material once it has passed through the spaces between the blades in the outermost row of the interposed rows.

BRIEF DESCRIPTION OF THE DRAWINGS

In the drawings.

The front of the mill is toward the left in FIGS. 1 and 2. Like numerals refer to like parts in the drawings.

DETAILED DESCRIPTION OF THE INVENTION

Figure 1:
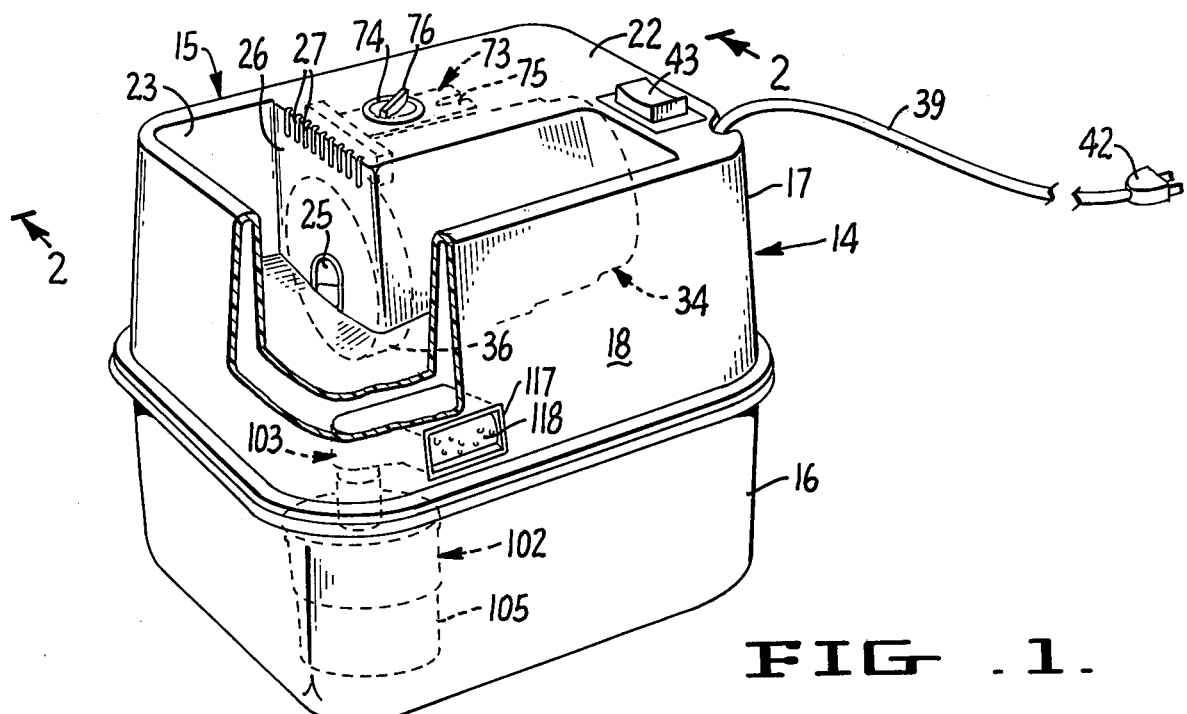
FIG. 1 is a perspective view of the preferred embodiment of the mill.

FIG. 1 depicts a rotary mill, generally designated 14, that is designed as a small kitchen appliance for milling raw, substantially dry, particulate foodstuffs such as dried fruit, dried vegetables, wheat, rye, rice, sugar, and soybeans into cracked, powdered, or flour form. Mill 14 is simple to operate and requires minimal cleaning. It also has no moving parts that are easily accessible to the user. Furthermore, it is small enough to be stored easily.

Mill 14 is presented to the user in two separable parts: a mill assembly, generally designated 15, and a milled product receiving pan 16. The outer configuration of assembly 15 and the inner configuration of pan 16 are such that assembly 15 may be turned upside down and placed inside pan 16 for storage. The storage position of pan 16 is shown in phantom in FIG. 2.

Figure 2:
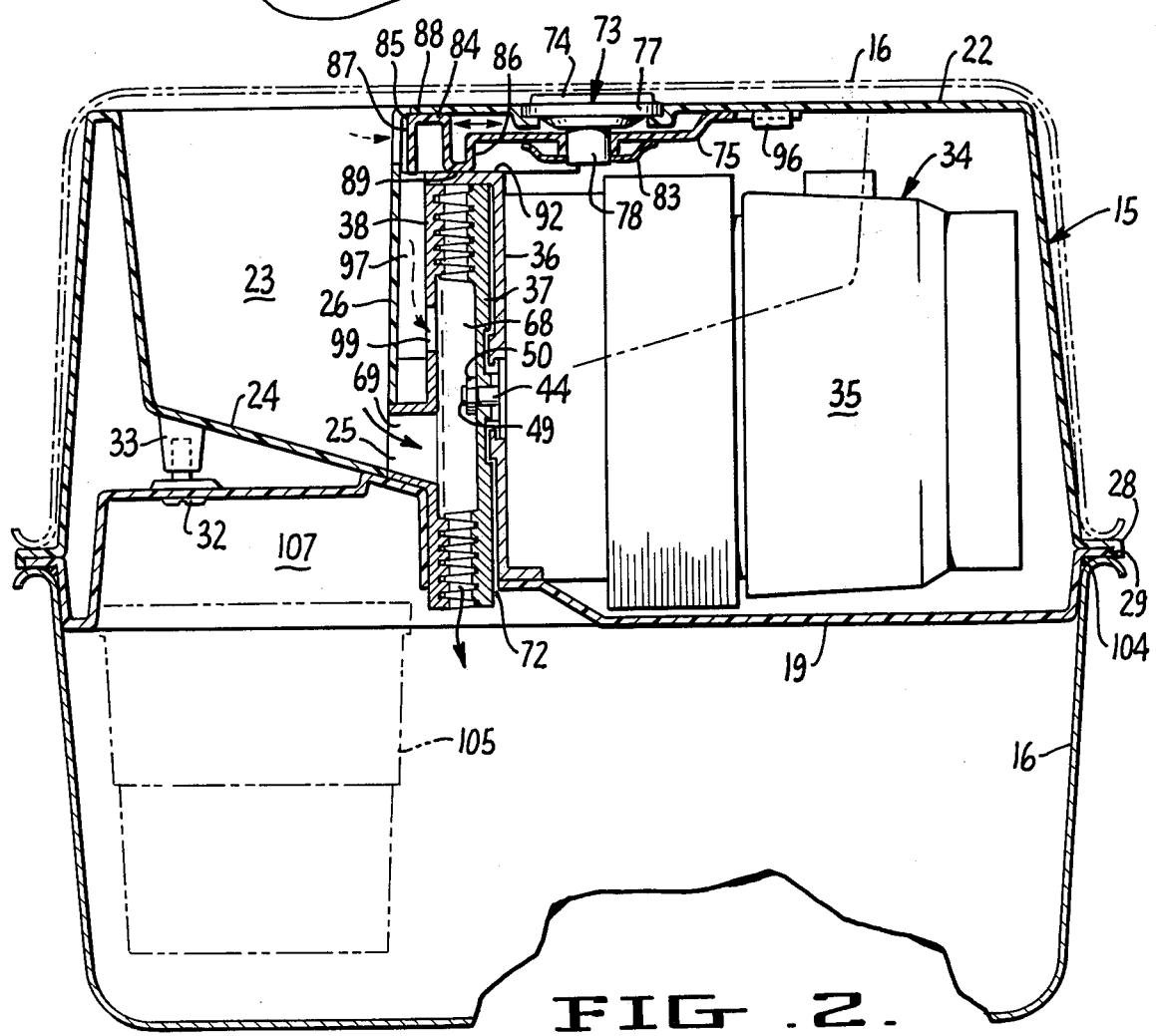
FIG. 2 is an enlarged sectional view of a portion of the mill of FIG. 1 taken along line 2—2 of FIG. 1.

Referring to FIGS. 1 and 2, the major part of mill assembly 15 that is seen by the user is a housing 17 that consists of a cover 18 and a base plate 19. Cover 18 prevents easy user access to the electrical and moving parts of assembly 15. Its top wall 22 has a generally L-shaped recess 23 that extends along the front and one side of cover 18 and serves as a hopper for the material to be milled. As shown in FIG. 2 bottom wall 24 of hopper 23 slopes such that the material to be milled gravitates towards a feed orifice 25 at the bottom of inside, front wall 26 of hopper 23. (Material gravitation into orifice 25 is indicated by the solid arrow in FIG. 2.)

Cover 15 also has a series of air vents 27 along the top edge of wall 26 that constitute part of the feed regulation means (described in detail below) of mill 14. It further has a shoulder 32 extending about its lower periphery into which a corresponding peripheral shoulder 29 of base plate 19 fits. Base plate 19 is affixed to cover 18 by screws, such as 32, that are received in threaded lugs, such as 33, projecting from the underside of cover 18 (FIG. 2).

Base plate 19 also prevents user access to the electrical and moving parts of mill assembly 15. It is also a mounting site for a motor-milling element subassembly, generally designated 34. Subassembly 34 basically comprises an electric motor 35, a rotor/stator housing 36, a rotor 37, and a stator 38. Rotor 37 and stator 38 are the milling elements of mill 14 and motor 35 is the drive means of the mill.

Motor 35 operates on 120 V ac and may be connected to line voltage by a conductor line 39 and a plug 42. Line 39 runs through a single pole, double throw switch 43 that has on, off, and pulse operation positions.

Figure 4:
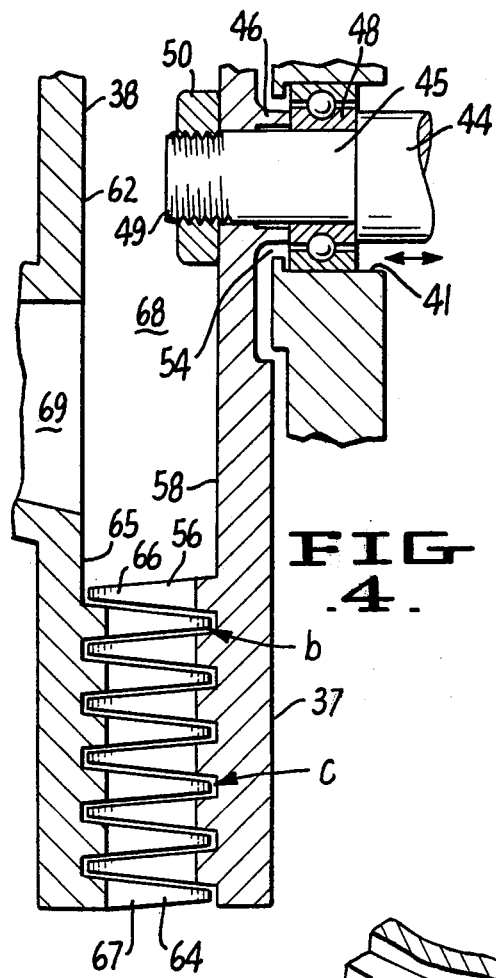
FIG. 4 is an enlarged vertical sectional view of a portion of the assembly of FIG. 3 showing the milling elements in operating position.

Motor 35 is a high speed motor that is capable of rotating its driving shaft 44 at speeds in the range of about 15,000 rpm to about 30,000 rpm. In lightweight embodiments of the invention, such as mill 14, the relative positions of motor 35 and hopper 23 are important in order to keep the motor torque from flipping the mill over. When the hopper is to the right of the motor (as in FIG. 1), the rotor should rotate counterclockwise, and vice versa. As shown in FIG. 4 the journaling of shaft 44 is such that a slight axial movement of shaft 44 (indicated by the double-headed arrow in FIG. 4) is permitted. Structure that permits such movement includes a reduced diameter forward end 45 of shaft 44, a boss 46 on the rear side of rotor 37 that encircles end 45, a notch 47 in housing 36 that also encircles end 45, and a shaft bearing 48 that rides in the space between the rear end of boss 46 and the junction between end 45 and the remainder of shaft 44. As seen in FIG. 4, the inner race of bearing 48 fits tightly between boss 46 and shaft 44, whereas the outer race of bearing 48 is free to move axially. As discussed below, this axial movement permits the axial spacing between rotor 37 and 38 to be varied. Shaft 44 has a threaded portion 49 at the tip of its forward end 45 for receiving rotor 37.

Rotor/stator housing 36 is mounted on the front side of motor 35 by screws (not shown) or other suitable attachment means. Housing 36 has a cylindrical recess 52 in its front side 53 for receiving rotor 37 and stator 38. A cylindrical orifice 54 extends axially through housing 36 at the center of recess 52. Shaft 44 extends freely through orifice 54.

Figure 3:
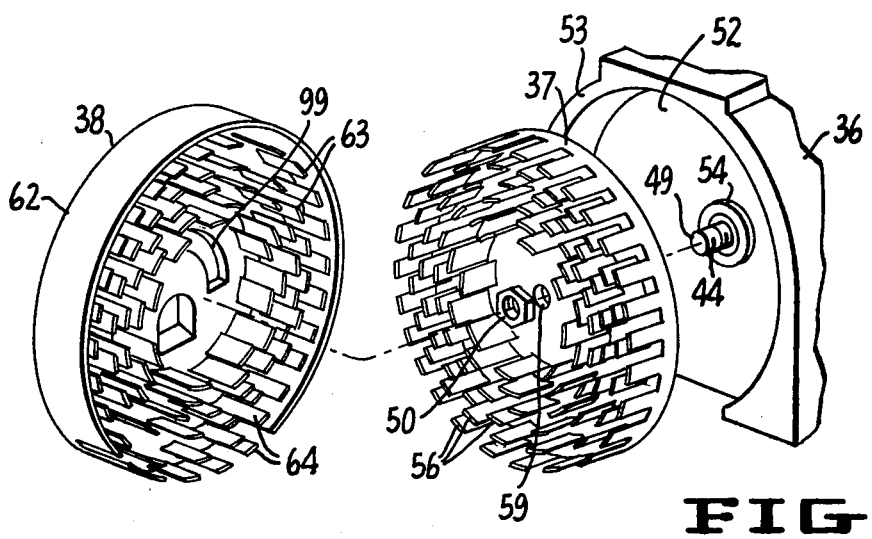
FIG. 3 is an enlarged, exploded view of the milling assembly of the mill of FIG. 1 with one of the milling elements rotated 90° relative to the other.

FIGS. 3 and 4 show the basic structures of rotor 37 and stator 38 and their spatial relationship to each other. Rotor 37 has a disc-shaped body 55 with six concentric, spaced rings or rows 56 of circumferentially spaced blades 57 extending generally perpendicularly from its front face 58. Body 55 has an axial bore 59 that receives shaft 44. A nut 50 affixes rotor 37 to end 49 of shaft 44 within recess 52.

Stator 38 also has a disc-shaped body 62. Six concentric, spaced rings or rows 63 of circumferentially spaced blades 64 extend generally perpendicularly from the rear face 65 of body 62. Referring to FIG. 4, rotor 37 and stator 38 are positioned in spaced, axially aligned relationship with their respective faces 58, 65 opposed and parallel and the rows 63 of stator 38 interposed in the valleys between the rows 56 of rotor 37. The radially innermost row of interposed rows 56, 63 is on rotor 37 and is designated 66. The radially outermost row of interposed rows 56, 63 is on stator 38 and is designated 67. Radially inward of row 66 is a central space 68 into which unmilled particulate material is fed from hopper 23 via feed inlet 25 which is defined by an orifice 69 in stator body 62 below the axis thereof.

As shown in FIGS. 2 and 3 recess 52 of housing 36 is open at the bottom edge of housing 36 to permit the bottom of the rotor/stator combination to extend slightly below the bottom of housing 36 and through a recessed product outlet opening 72 in base plate 19.

Figure 7:
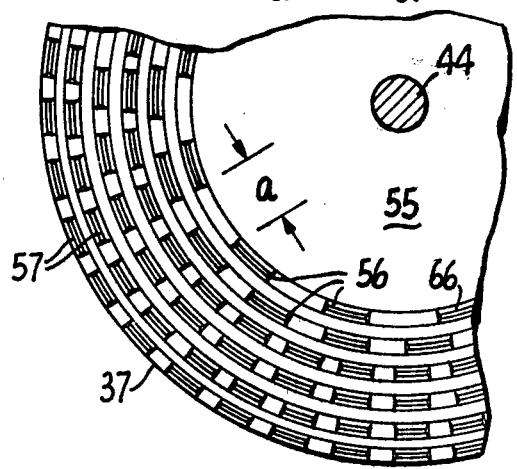
FIG. 7 is an enlarged plan view of a portion of the other milling element of FIG. 3.

The circumferential spacing of blades 57 in row 66 of rotor 37 (represented by the letter "a" in FIG. 7), the radial spacing between rotor rows 56 and stator rows 63 (represented by the letter "b" in FIG. 4) and the axial spacing between rotor 37 and stator 38 (represented by the letter "c" in FIG. 4) are important features of the mill. Those spacings affect the particle size and uniformity of the milled product. The circumferential spaces between both rotor blades 57 and stator blades 64 are oriented substantially radially, that is they are generally perpendicular rather than inclined relative to the direction of rotation of rotor 37. For foodstuff milling, the minimum circumferential spacing between blades in row 66 is about 0.15 inch (about 0.4 cm). Such spacing permits the unmilled feed to pass through the voids between blades in row 66. If the spacing was significantly less than 0.15 inch (0.4 cm) the feed would tend to remain within space 68 rather than passing through said voids. The radial spacing between rows 56, 63 should be between about 0.02 inch (about 0.05 cm) and about 0.035 inch (about 0.09 cm). Radial spacing below 0.02 inch (0.05 cm) may not provide sufficient clearance tolerance to insure that the rows do not contact each other when the mill is operated. Radial spacing significantly greater than 0.035 inch (0.09 cm) may cause the milled product to be coarse. The axial spacing between rotor 37 and stator 38 may vary between about 0.02 (about 0.05 cm) and about 0.08 inch (about 0.2 cm), with the particle size of the milled product varying accordingly from very fine flour to coarse consistence over the spacing range.

Figure 6:
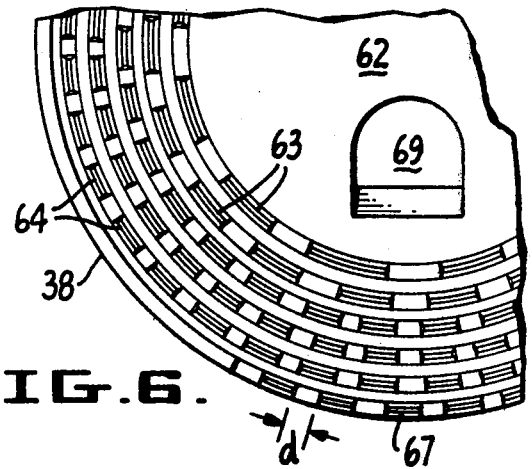
FIG. 6 is an enlarged plan view of a portion of one of the milling elements of FIG. 3.

The circumferential spacing between blades 64 in outermost row 67 of stator 38 (represented by the letter "d" in FIG. 6) should be large enough to permit product of cracked particle size to pass through the voids between the blades in row 67. Therefore, that spacing should be at least about 0.05 inch (0.12 cm). Accordingly, the circumferential spacing between blades 57 and 63 is not equal in each of rows 56, 63. Instead, as indicated, the blade spacing on outermost row 67 is less than the blade spacing on innermost row 66. The decrease in blade spacing may be progressive (spacing is less in each outwardly succeeding row) or stepped (two or more successive rows have identical spacing). Circumferential spacing between blades in the rows 56, 63 intermediate rows 66, 67 should also be at least about 0.05 inch (0.12 cm).

Figure 5:
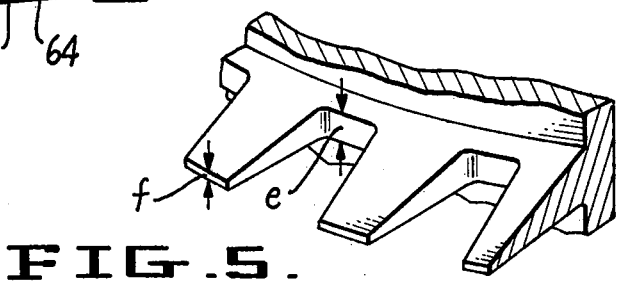
FIG. 5 is an enlarged perspective view of a portion of one of the milling elements showing the structure of the element's blades.

The shapes of the rotor blades 57 and the stator blades 64 are also important. As shown in FIG. 5 blades 57 and 64 are plane-sided bodies that have two opposing radial sides, two opposed circumferential sides, and a top side. The blades are elongated circumferentially, that is their circumferential dimension is greater than their radial dimension. The circumferential and radial sides taper at least about 2°, causing the blades to have a trapezoidal cross-section either circumferentially or radially (FIGS. 4 and 5). Preferably all sides taper to the same degree. Such taper enhances the strength of the blades and enables them to withstand the forces applied to them without breaking. The blade thickness at base and tip (represented by the letters "e" and "f," respectively, in FIG. 5) also affects blade strength. Rotors and stators made from stainless steel or aluminum having blades with a base thickness of 0.07 inch (0.18 cm) and tip thickness of 0.03 inch (0.08 cm) have been used without breakage. The width and length of the blades are believed to be of lesser importance. Both are desirably at least about 0.02 inch (0.5 cm).

The rate at which unmilled feed enters milling element subassembly 34 via orifices 25, 69 is controlled pneumatically by regulating the amount of air that mixes with the feed in space 68 between rotor 37 and stator 38. The less air, the greater the feed rate and vice versa. As discussed in detail below the feed rate in turn affects and controls the particle size of the milled product. The feed regulation means is shown in FIGS. 2 and 8–10. Air enters the means through air vents 27 in wall 26 of hopper 23. Air flow is indicated by the dashed arrows in FIG. 2 and the dashed and solid arrows in FIG. 9. Air is drawn through vents 27 by the suction created by the rotation of rotor 37.

Figures 8, 9, 10, 11:
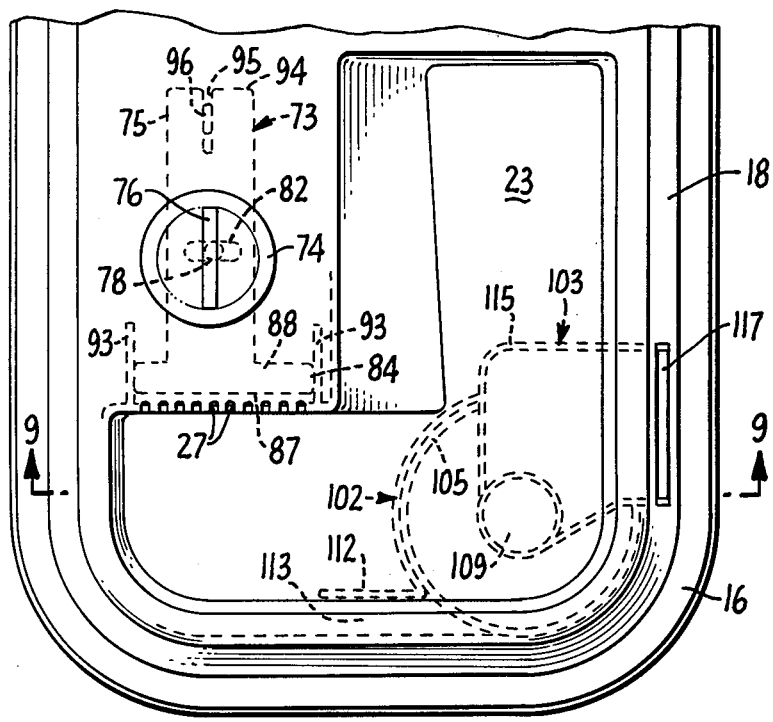
FIG. 8 is a top plan view of a portion of the mill of FIG. 1.
FIG. 9 is a sectional view of the mill of FIG. 1 taken along line 9—9 of FIG. 8.
FIG. 10 is an enlarged, exploded view of a portion of the mill of FIG. 1 showing the feed regulating means of the mill.
FIG. 11 is an enlarged, partly sectional view of a portion of the mill of FIG. 1 showing a cyclone separator assembly of the mill.

The amount of air permitted to enter through vents 27 is regulated by a damper mechanism, generally indicated 73. Damper 73 consists basically of a discoid control knob 74 that functions as a cam and a horizontally slidable member 75 that acts as a follower. Control knob 74 has an upstanding finger grip 76 on its top side, an increased diameter mid-section 77, and an eccentrically positioned shaft 78 extending downwardly from its bottom side. Knob 74 is seated in a stepped circular opening 79 in wall 22 of cover 18 with mid-section 77 resting on the step and shaft 78 extending down through opening 79. Shaft 78 is received in an oblong opening 82 in member 75 and is held in place by a snap-fitting washer 83 that fits around the bottom end of shaft 78. Front end 84 of member 75 has a leading ridge 85 and a following furrow 86 (FIGS. 2 and 10). Ridge 85 is slightly wider than the row of air vents 27 and its height (vertical dimension) is slightly greater than the height of vents 27. Accordingly, when member 75 is slid to its forwardmost position, front face 87 of ridge 85 is proximate to the inside of wall 26 behind vents 27, thereby substantially covering and blocking or closing vents 27. Top side 88 of ridge 85 rides against the interior side of wall 22 and the bottom side 89 of furrow 86 (FIG. 2) rides against the top edge 92 of rotor-stator housing 36, thus inhibiting member 75 from moving vertically. The ends of ridge 85 and furrow 86 ride within a pair of parallel, lateral ways 93 (FIG. 8). Rear end 94 of member 75 has a slot 95 in which a stop member 96 extending downwardly from the interior side of wall 22 is received. When member 75 is slid rearwardly such that the closed (front) end of slot 95 engages stop 96, damper 73 is wide open and permits maximum air flow through vents 27.

As depicted in FIGS. 2 and 8 air entering vents 27 is drawn downwardly between face 87 and the inside of wall 26 into a channel 97 defined by the inside of wall 26, the front side of stator 38, ways 93, and a bottom wall 98. From channel 97 the air passes rearwardly through an elongated opening 99 in stator 38 into space 68 to mix with the incoming feed.

The rotation of rotor 37 creates substantial air flow and pressure in receiving pan 16 when mill 14 is operating. It was thus found desirable to provide mill 14 with a cyclone-type inertial separator, generally designated 102, to collect the milled product of fine particle size that is entrained in the air as a result of said air flow and pressure. The mill is also provided with an air filter assembly, generally designated 103, from which the air from the separator 102 is vented to the atmosphere. Without a separator the entrained particles of milled product tend to be blown out of receiving pan 16 around the periphery thereof at the junction of shoulders 28 and 29. This occurs notwithstanding the presence of a gasket 104 at that juncture.

Cyclone separator 102 and air filter assembly 103 are illustrated in FIGS. 1 and 8–10. Separator 102 consists of a two-segment telescoping cylindrical cup 105 whose upper segment 106 is received partly in a generally cylindrical recess 107 formed in the bottom of base plate 19 near the front corner thereof. The lip 108 of cup 105 fits into a groove within recess 107 to hold cup 105 in place. A vertically elongated air outlet passageway 109 is formed in base plate 19 generally centrally within recess 107. The lower end of passageway 109 extends below the lip of cup 105. Cup 105 has a flat, tapered handle 110 that extends outwardly from the exterior of segment 106 slightly below the lip of the cup. Handle 110 is thus in spaced, parallel position relative to the bottom of base plate 19. Handle 110 together with base plate 19 and a vertical wall member 112 extending downwardly from the bottom of base plate at the exterior of recess 107 define a tangential inlet 113 to separator 102. As illustrated in FIGS. 9 and 11 a vortex mode of air flow is created within cup 105 as a result of tangential inlet 113.

Air filter assembly 103 is received tightly within the upper end of passageway 109 by means of a cylindrical connector 114 that is an integral part of housing 115 of assembly 103. Housing 115 has a rectangular opening 116 that registers with a like-shaped opening 117 in cover 18. The portion of housing 115 about opening 116 seats tightly against the inside of cover 18 at the periphery of opening 117. The tight fits between housing 115 and passageway 108 and cover 18 ensure that air flow from cup 105 to the atmosphere occurs via air filter assembly 103. An F-shaped filter element 118 is removably received within housing 115 through openings 116, 117. Filter element 118 traps entrained milled product particles that did not settle in separator 102. Element 118 may be made from porous or fibrous plastic or natural materials.

When mill 14 is stored, lower segment 119 of cup 105 may be retracted into upper segment 106 and the retracted cup placed into hopper 23.

Mill 14 is very easy to operate. Starting from their stored positions, mill assembly 15 and receiving pan 16 are first separated and segment 119 is telescoped out of segment 106 and cup 105 is inserted into recess 107. Assembly 15 is then placed on top of pan 16 as shown in FIG. 1 and in solid line in FIG. 2. Air damper mechanism 73 is then adjusted to the desired position by turning knob 74. As indicated previously when damper 73 is wide open a maximum amount of air mixes with the feed. Under these conditions the feed rate is minimized and a minimum load is placed on motor 35. Motor 35 thus runs at near top speed thus permitting mill 14 to mill the feed to a fine particle size. Vice versa, when mechanism 73 is closed a minimum quantity of air mixes with the feed. When this occurs, the feed rate is maximized and so is the load on motor 35. The greater load causes a decrease in the speed of rotor 37, which in turn results in a coarsely milled product. Damper settings intermediate full open and full close provide a product having particle sizes intermediate that of the full open product and the full close product. Markings indicating the varying degree of particle size may be made about the periphery of opening 79 to guide the user in selecting the desired position for damper 73. After setting damper 73 the foodstuff to be milled is dumped into hopper 23. Mill 14 is then plugged into line voltage via line 39 and plug 42. Motor 35 is then activated by moving switch 43 to its on position. Turning motor 35 on forces its driving shaft 44 to its forwardmost position (axial spacing between rotor 37 and stator 38 is about 0.02 inch (0.05 cm)) and rotates rotor 37.

After motor 35 is turned on, the foodstuff gravitates from hopper 23 through orifices 25 and 69 into the central space 68 between rotor 37 and stator 38. The foodstuff is flung outwardly in space 68 (by the rotation of rotor 37) and into the voids between blades 57 of row 66. There it is sheared between those blades and the blades 64 of the adjacent row 63 of stator 38. The linear velocity of blades 57 of row 66 is an important operating parameter of mill 14. In order to mill foodstuff to a uniform, fine consistency the linear velocity of blades 57 of row 66 must be at least about 45 meters/second, preferably in the range of 45 to 250 meters/second. The linear velocity will depend upon the rotational velocity of rotor 37 and the distance of row 66 from the axis of rotation. The above linear velocities must be maintained under load, that is during milling.

The portions of the foodstuff that are sheared off between row 66 and the adjacent row 63 of stator 38 pass into the voids between the blades of said adjacent row 63 of stator 38. It then is comminuted by shearing by and/or impact with the next adjacent outward row of blades of rotor 37. In this manner the foodstuff passes successively outwardly through the voids in the rotor and stator blade rows and is successively comminuted to a finer consistency at each row. There is no significant recirculation of foodstuff inwardly. Once it reaches outermost row 67 of stator 38 it passes through the voids thereof and drops out of mill assembly 15 into pan 16 via outlet opening 72 in base plate 19. Any fines or light components (eg, bran) in the product that became entrained in the air circulating within pan 16 collect in cup 105 of separator 102 or are entrapped in filter element 118.

A milled product of cracked consistency may be made by closing damper 73 and moving switch 43 to its pulse operation position. This causes the motor 35 to turn off and on which in turn causes shaft 44 to move rearward, thus increasing the axial spacing between rotor 37 and stator 38 (maximum 0.08 inch, 0.2 cm). This rearward motion of shaft 44 occurs automatically due to the relaxation of the magnetic field generated by motor 35.

After all the foodstuff has passed from hopper 23, the mill is permitted to run for a few seconds to allow all the foodstuff to clear from mill assembly 15. This clearance is evidenced by an increase in the speed of motor 35 as it transitions from load to free-running conditions. The mill is then turned off by moving switch 43 to its off position. Mill assembly 15 is then lifted from pan 16 to expose the milled product. If mill assembly 15 is inadvertently lifted from pan 16 without turning the mill off, row 67 of stator 38 acts as a guard to keep the user's hands out of contact with rotor 37. Cup 105 is removed from recess 107 and its contents are discarded or mixed with the rest of the product in pan 16, as desired.

In normal operation the foodstuff passes cleanly and completely through mill assembly 15 into pan 16. Accordingly, the only clean up that is required is to wipe the bottom of base plate 19, the interior of pan 16, and cup 105 once the milled product has been removed therefrom. Filter element 118 should be cleaned periodically. This may be done by withdrawing it from within housing 115 via opening 116 and washing it with air and/or water.

As indicated above mill 14 is designed as a home kitchen appliance. Other home kitchen embodiments or embodiments intended for other uses such as commercial or industrial milling or foodstuffs or other particulate material such as ores and crystalline chemicals may involve modifications of mill 14. Such modifications might include having more or fewer rows of blades on the rotor and stator, using a second rotor in place of the stator, employing a rotor/stator combination of larger diameter, increasing the spacing between the innermost row of blades on the rotor to accommodate larger material, or using other means such as a lever to move the motor shaft and vary the axial spacing between rotor and stator. In this regard home kitchen embodiments will usually have 4 to 12 rows of blades on their rotors and an equal number of rows of blades on their stators. Embodiments in which a second rotor is used in place of a stator will require two motors, since the rotors will be rotated in opposite directions. Such embodiments will permit lower blade velocities since the relative velocity between adjacent rows of blades will be greater when these rows are rotating in opposite directions. However, such embodiments are not preferred for home kitchens since the second motor makes the mill larger, heavier, and expensive.

These and other modifications that are within the ordinary skill of workers in the mechanical and milling arts are intended to be within the scope of the following claims.

I claim:

1. A process for milling a particulate material comprising:
   (a) positioning a first wheel having concentric rows of circumferentially spaced, tapered plane-sided blades extending from one of its faces in spaced axial alignment with a second wheel having concentric rows of circumferentially spaced tapered plane-sided blades extending from one of its faces such that the rows of blades on the first and second wheels are interposed between each other, with the circumferential spacing between blades in the radially innermost row of the interposed rows being at least equal to the maximum nominal particle size of the material to be milled and the circumferential spacing between blades in the radially outermost row of the interposed rows being less than the circumferential spacing between blades in said radially innermost row and being at least equal to the desired maximum nominal particle size of the milled material;
   (b) feeding the material into the axial space between the first and second wheels radially inward of said innermost row;
   (c) rotating at least the wheel on which the innermost row is located at a speed sufficient to cause the material:
      (i) to move through the spaces in the innermost row,
      (ii) to be sheared between the blades of the innermost row and the row next adjacent the innermost row, and
      (iii) to pass successively outwardly through the spaced between the blades of the interposed rows and be successively comminuted to a smaller particle size as it passes through each row without significant recirculation inwardly; and
   (d) collecting the material once it has passed completely through the interposed rows.

2. The process of claim 1 including the step of feeding air at an adjustable rate into the axial space between the first and second wheels simultaneously with the material, thereby regulating the rate at which the material is milled and the particle size of the milled material.

3. A rotary mill for milling a particulate material comprising in combination:
   (a) a housing:
   (b) a first wheel mounted within the housing and having concentric rows of circumferentially spaced tapered plane-sided blades extending from one of its faces;
   (c) a second wheel mounted within the housing in spaced, axial alignment with the first wheel and having concentric rows of circumferentially spaced tapered plane-sided blades extending from one of its faces with
      (i) the blades on both the first wheel and second wheel having circumferential dimensions that are greater than their radial dimensions,
      (ii) the rows of said second wheel being interposed in radially spaced alternating relationship between the rows of said first wheel,
      (iii) the circumferential spacing between the blades in the innermost row of the interposed rows being at least equal to the maximum nominal particle size of the material,
      (iv) the circumferential spacing between the blades in the outermost row of the interposed rows being less than the circumferential spacing between the blades in the innermost row and being at least equal to the desired maximum nominal particle size of the milled material, and
      (v) the circumferential spaces between the blades on both the first wheel and the second wheel being oriented substantially radially,
   (d) an inlet in the housing for receiving the material that opens into the axial space between the first and second wheels radially inward of said innermost row;
   (e) an outlet in the housing for discharging the particulate material located radially outward of the outermost row of said interposed rows; and
   (f) driving means connected to at least the one of said wheels on which the innermost row is located for rotating it such that the relative linear velocity between the innermost row and the row next adjacent to the innermost row is sufficient to shear the particulate material between the blades of the innermost row and the blades of the row next adjacent to the innermost row.

4. The mill of claim 3 wherein the driving means is connected to only said first wheel and said second wheel is stationary.

5. The mill of claim 4 wherein said outermost row is on the second wheel.

6. The mill of claim 5 wherein the material is a foodstuff having a maximum nominal particle size not greater than about 0.15 inch, and the desired maximum nominal particle size of the milled material is about 0.05 inch.

7. The mill of claim 3 wherein the blades of the first and second wheels are shaped as trapezoidal bodies, each side of said blades having a taper of at least 2°.

8. The mill of claim 3 wherein the inlet opens into said space at a location below the axes of the first and second wheels.

9. The mill of claim 3 wherein there are 4 to 12 rows of blades on the first wheel and an equal number of rows of blades on the second wheel.

10. The mill of claim 9 wherein said linear velocity is at least 45 meters per second.

11. The mill of claim 9 wherein said linear velocity is in the range of 45 and 250 meters per second.

12. The mill of claim 3 including (g) a hopper that communicates with said inlet for holding the material.

13. The mill of claim 12 including:
   (h) material feed regulating means that communicates with said inlet and regulates pneumatically the rate at which material is fed into the mill;
   (i) a receiver for receiving particulate material exiting from the outlet, the periphery of the receiver contacting the housing such that the housing acts as a lid for the receiver; and
   (j) an inertial separator within the receiver for collecting milled product that becomes entrained in the air circulating with the receiver.

14. The mill of claim 3 including:

(g) means for varying the axial spacing between the first wheel and the second wheel.

15. A rotary mill for milling particulate foodstuff comprising in combination:
   (a) a housing;
   (b) a rotor mounted within the housing and having 4 to 12 concentric rows of circumferentially spaced, tapered plane-sided blades having a greater circumferential dimension than radial dimension extending from one of its faces, with the circumferential spacing between blades in the radially innermost row being at least about 0.15 inch and the circumferential spaces between blades being oriented substantially radially;
   (c) a stator mounted within the housing and having 4 to 12 concentric rows of circumferentially spaced, tapered plane-sided blades having a greater circumferential dimension than radial dimension and extending from one of its faces with the circumferential spacing between blades in the outermost row being less than the circumferential spacing between blades in said innermost row and being at least about 0.05 inch, the circumferential spaces between blades being oriented substantially radially, the rows being interposed between the rows on the rotor such that the radial spacing between the interposed rows is about 0.02 inch to about 0.035 inch and the axial spacing between the rotor and stator is about 0.02 inch to about 0.08 inch and said innermost row is the radially innermost of the interposed rows and said outermost row is the radially outermost of the interposed rows;
   (d) an inlet in the housing for receiving the foodstuff that opens into the axial space between the rotor and stator radially inward of said innermost row below the axes of the rotor and stator;
   (e) a hopper for holding the foodstuff that communicates with said inlet;
   (f) material feed regulating means that communicates with said inlet and regulates pneumatically the rate at which material is fed into the mill;
   (g) an outlet in the housing for discharging the milled foodstuff located radially outward of said outermost row;
   (h) a receiving pan for receiving milled foodstuff exiting from said outlet the periphery of the receiver contacting the housing such that the housing acts as a lid for the receiver;
   (i) an inertial separator within the receiver for collecting milled product that becomes entrained in the air circulating with the receiver; and
   (j) an electric motor on whose driving shaft the rotor is mounted for rotating the rotor at a speed sufficient to cause the linear velocity of said innermost row to be between about 45 meters/second and about 250 meters/second.

16. The rotary mill of claim 11 including:
   (k) means for varying the axial spacing between the rotor and stator over said 0.02 inch to 0.08 inch range.

17. The rotary mill of claim 11 wherein the material feed regulating means comprises an air opening in the housing, an air channel that extends from the air opening to the axial space between the first and second wheels, and an adjustable damper that intersects the air channel to vary the dimensions thereof.

18. The rotary mill of claim 17 wherein the inertial separator is a tangential inlet cyclone separator that is vented to the atmosphere via an air passageway through the housing that extends from the separator to the atmosphere, said air passageway having a filter element for entrapping milled product entrained in the air passing therethrough.

* * * * *

REEXAMINATION CERTIFICATE (3937th)

United States Patent [19]

Dickson, Jr.

[11] B1 4,203,555
[45] Certificate Issued Nov. 23, 1999

[54] ROTARY FOODSTUFF MILL AND MILLING PROCESS

[76] Inventor: Thomas D. Dickson, Jr., 1099 Del Cambre, San Jose, Calif. 95129

Reexamination Request:
No. 90/005,187, Dec. 14, 1998

Reexamination Certificate for:
Patent No.: 4,203,555
Issued: May 20, 1980
Appl. No.: 06/028,666
Filed: Apr. 10, 1979

Related U.S. Application Data

[63] Continuation-in-part of application No. 05/905,841, May 15, 1978, abandoned.

[51] Int. Cl.⁶ ........................................................ B02C 7/09
[52] U.S. Cl. ........................ 241/15; 241/24.1; 241/79.1; 241/100; 241/248; 241/261; 241/261.2
[58] Field of Search ........................................... 241/261.2

[56] References Cited

U.S. PATENT DOCUMENTS

| | | | |
|---|---|---|---|
| 6,902 | 11/1849 | Learned et al. | 241/56 |
| 213,471 | 3/1879 | Toufflin | 241/30 X |
| 335,827 | 2/1886 | Mead | 241/48 |
| 543,633 | 7/1895 | Schoff | 241/169.1 |
| 901,217 | 10/1908 | Touya, Jr. | 241/188 A |
| 1,447,013 | 2/1923 | Graaf | 241/12 X |
| 1,970,330 | 8/1934 | Mason | 241/251 X |
| 2,093,703 | 9/1937 | Blodgett . | |
| 2,347,383 | 4/1944 | Wiegratz | 241/89.1 |
| 2,988,290 | 6/1961 | Merges . | |
| 3,047,243 | 7/1962 | Merger et al. . | |
| 3,497,144 | 2/1970 | Hint | 241/188 R |
| 3,815,835 | 6/1974 | Apostol et al. | 241/261 X |
| 3,995,784 | 12/1976 | de los Santos Izquierdo | 241/275 |
| 4,004,741 | 1/1977 | Perry | 241/55 |
| 4,011,027 | 3/1977 | Selder | 241/188 A X |

FOREIGN PATENT DOCUMENTS

| | | |
|---|---|---|
| 326110 | 9/1920 | Germany . |
| 443371 | 4/1927 | Germany . |
| 746618 | 8/1944 | Germany . |
| 173310 | 11/1934 | Switzerland . |
| 14016 | of 1889 | United Kingdom . |

*Primary Examiner*—Mark Rosenbaum

[57] ABSTRACT

A rotary mill for milling particulate material is described. The preferred embodiment of the mill comprises a housing; a rotor and a stator axially aligned and spaced within the housing, each of which is concentric rows of circumferentially spaced tapered plane-sided blades extending from one of its faces, the rows on the rotor and stator being interposed between each other and radially spaced, with the radially innermost row being on the rotor and having a blade spacing at least equal to the maximum nominal particle size of the material, and the outermost row being on the stator and having a blade spacing less than the innermost row and at least equal to the desired maximum nominal particle size of the milled material; a material inlet in the housing that opens into the axial space between the rotor and stator inward of the innermost row; a pneumatic feed regulating means that mixes air with the feed entering said axial space and thereby controls the feed rate and milled material particle size; a milled product outlet in the housing located radially outward of the outermost row; a receiving pan for collecting milled product; a cyclone separator in the receiving pan for separating entrained milled product; and an electric motor whose driving shaft is connector to the rotor.

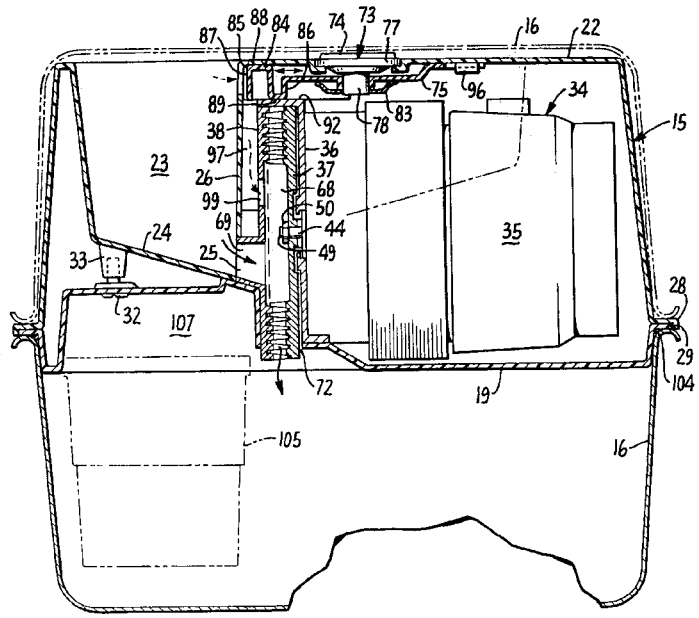

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *